United States Patent
Kawale et al.

(10) Patent No.: US 10,332,015 B2
(45) Date of Patent: Jun. 25, 2019

(54) PARTICLE THOMPSON SAMPLING FOR ONLINE MATRIX FACTORIZATION RECOMMENDATION

(71) Applicant: Adobe Inc., San Jose, CA (US)

(72) Inventors: Jaya B. Kawale, San Jose, CA (US); Branislav Kveton, San Jose, CA (US); Hung H. Bui, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 646 days.

(21) Appl. No.: 14/885,799

(22) Filed: Oct. 16, 2015

(65) Prior Publication Data

US 2017/0109642 A1  Apr. 20, 2017

(51) Int. Cl.
  *G06N 7/00* (2006.01)
  *G06F 17/16* (2006.01)
  *G06Q 10/06* (2012.01)
  *G06Q 30/02* (2012.01)

(52) U.S. Cl.
  CPC ............. *G06N 7/005* (2013.01); *G06F 17/16* (2013.01); *G06Q 10/067* (2013.01); *G06Q 30/0282* (2013.01)

(58) Field of Classification Search
  USPC .......................................................... 706/52
  See application file for complete search history.

(56) References Cited

U.S. PATENT DOCUMENTS

| | | | | |
|---|---|---|---|---|
| 8,625,860 B2 * | 1/2014 | Kveton | ............ | G06K 9/00926 382/115 |
| 8,630,963 B2 * | 1/2014 | Phielipp | ............ | G06F 21/316 706/12 |
| 8,903,315 B2 * | 12/2014 | Pering | .............. | H04W 4/80 455/41.2 |
| 9,015,099 B2 * | 4/2015 | Nitz | ................ | H04L 51/02 706/46 |

(Continued)

OTHER PUBLICATIONS

ACM (DL) Digital Library Pairwise Preferences Based Matrix Factorization and Nearest Neighbor Recommendation Techniques Saikishore Kalloori, Francesco Ricci, Marko Tkalcic Free University of Bozen—Bolzano, Bolzano, Italy RecSys '16 Proceedings of the 10th ACM Conference on Recommender Systems pp. 143-146.*

(Continued)

*Primary Examiner* — Michael B Holmes
(74) *Attorney, Agent, or Firm* — SBMC

(57) ABSTRACT

Particle Thompson Sampling for online matrix factorization recommendation is described. In one or more implementations, a recommendation system provides a recommendation of an item to a user using Thompson Sampling. The recommendation system then receives a rating of the item from the user. Unlike conventional solutions which only update the user latent features, the recommendation system updates both user latent features and item latent features in a matrix factorization model based on the rating of the item. The updating is performed in real time which enables the recommendation system to quickly adapt to the user ratings to (Continued)

provide new recommendations. In one or more implementations, to update the user latent features and the item latent features in the matrix factorization model, the recommendation system utilizes a Rao-Blackwellized particle filter for online matrix factorization.

20 Claims, 6 Drawing Sheets

(56) References Cited

U.S. PATENT DOCUMENTS

| | | | |
|---|---|---|---|
| 9,501,745 B2* | 11/2016 | Nitz | H04L 51/02 |
| 9,862,352 B2* | 1/2018 | Lortz | B60R 25/25 |
| 10,163,058 B2* | 12/2018 | Nitz | G06N 5/04 |
| 2014/0229486 A1* | 8/2014 | Kveton | G06F 17/30731 707/737 |
| 2015/0156545 A1* | 6/2015 | Kveton | H04N 21/44218 725/14 |
| 2015/0199715 A1* | 7/2015 | Caron | G06Q 30/0241 705/14.52 |
| 2015/0379275 A1* | 12/2015 | Fawaz | H04L 67/306 |
| 2016/0006700 A1* | 1/2016 | Fawaz | H04L 67/306 726/26 |
| 2016/0086086 A1* | 3/2016 | Gabillon | G06F 17/30522 706/11 |

OTHER PUBLICATIONS

Factorization Bandits for Interactive Recommendation Huazheng Wang, Qingyun Wu, Hongning Wang Department of Computer Science University of Virginia, Charlottesville VA, 22904 USA Copyright c 2017, Association for the Advancement of Artificial Intelligence pp. 1-8.*
ACM (DL) Digital Library Rank and relevance in novelty and diversity metrics for recommender systems Saúl Vargas Pablo Castells Universidad Autónoma de Madrid, Madrid, Spain RecSys '11 Proceedings of the fifth ACM conference on Recommender systems pp. 109-116 Oct. 23-27, 2011.*
Towards Optimal Active Learning for Matrix Factorization in Recommender Systems Rasoul Karimi; Christoph Freudenthaler; Alexandros Nanopoulos; Lars Schmidt-Thieme 2011 IEEE 23rd International Conference on Tools with Artificial Intelligence Date of Conference: Nov. 7-9, 2011 pp. 1069-1076.*
ACM Digital Library Pairwise Preferences Based Matrix Factorization and Nearest Neighbor Recommendation Techniques Saikishore Kalloori, Francesco Ricci, Marko Tkalcic Proceeding RecSys '16 Proceedings of the 10th ACM Conference on Recommender Systems pp. 143-146 Sep. 15-19, 2016.*
Factorization Bandits for Interactive Recommendation, Huazheng Wang, Qingyun Wu, Hongning Wang, 2017, Association for the Advancement of Artificial Intelligence, pp. 1-8.*
Online Interactive Collaborative Filtering Using Multi-Armed Bandit with Dependent Arms Qing Wang, Chunqiu Zeng, Wubai Zhou, Tao Li, Larisa Shwartz, Genady Ya. Grabarnik pp. 1-10.*
ACM Digital Library Collaborative Filtering Bandits Shuai Li, Alexandros Karatzoglou, Claudio Gentile Proceeding SIGIR '16 Proceedings of the 39th International ACM SIGIR conference on Research and Development in Information Retrieval pp. 539-548 Jul. 17-21, 2016.*
Agrawal,"Thompson Sampling for Contextual Bandits with Linear Payoffs", In Proceedings of the 30th International Conference on Machine Learning, 2013, 9 pages.
Arnold,"Conditionally specified distributions: An introduction", Statistical Science, 16(3):, 2001, 26 pages.
Castillo,"Multiple modes in densities with normal conditionals", Statist. Probab. Lett., 49:, 2000, 10 pages.
Chapelle,"An Empirical Evaluation of Thompson Sampling", In Advances in neural information processing, 2011, 9 pages.
Chopin,"A Sequential Particle Filter Method for Static Models", Biometrika, Dec. 12, 2000, 31 pages.
Douce,"Rao-Blackwellised Particle Filtering for Dynamic Bayesian Networks", In Proceedings of the Sixteenth conference on Uncertainty in artificial intelligence, 2000, pp. 176-183.
Gelman,"A note on bivariate distributions that are conditionally normal", American Statistics, 1991, 2 pages.
Gentile,"Online clustering of bandits", 2014, 20 pages.
Gopalan,"Thompson sampling for complex online problems", In Proceedings of the 31st International Conference on Machine Learning, 2014, 9 pages.
Kocak,"Spectral Thompson Sampling", In Proceedings of the Twenty-Eighth AAAI Conference on Artificial Intelligence, 2014, 8 pages.
Koren,"Matrix factorization techniques for recommender systems", in IEEE journal of Computer vol. 42, issue 8, Aug. 2009, pp. 42-49.
Maillard,"Latent bandits", In Proceedings of the 31th International Conference on Machine Learning, ICML 2014, Beijing, China, 2014, 19 pages.
Moral,"Sequential monte carlo samplers", Journal of the Royal Statistical Society: Series B (Statistical Methodology), 68(3), 2006, 29 pages.
Salakhutdinov,"Bayesian Probabilistic Matrix Factorization using Markov Chain Monte Carlo", In ICML, 2008, 8 pages.
Salakhutdinov,"Probabilistic Matrix Factorization", In NIPS, 2007, 8 pages.
Valko,"Spectral bandits for smooth graph functions", In 31th International Conference on Machine Learning,, 2014, 12 pages.
Zhao,"Interactive Collaborative Filtering", In Proceedings of the 22nd ACM international conference on Conference on information & knowledge management, 2013, 10 pages.

* cited by examiner

PARTICLE THOMPSON SAMPLING FOR ONLINE MATRIX FACTORIZATION RECOMMENDATION

Conventional recommendation systems analyze patterns of user interest and ratings in items (e.g., products, songs, videos, advertisements) to provide personalized recommendations for users. Some conventional recommendation systems use latent feature models to explain ratings by characterizing both items and users on features inferred from ratings patterns. In other words, based on ratings of items received from users, the recommendation system attempts to infer user latent features associated with users and item latent features associated with items. As described herein, item latent features describe features of items, while user latent features describe features of users. The features are considered "latent" because they are inferred from user ratings of the items. As an example, item latent features for movies might measure whether a movie is a drama or a comedy, the amount of action or violence, or whether the movie is suitable for children. In contrast, user latent features for movies may measure the genres of movies a user likes or dislikes, actors that the user likes and dislikes, and so forth.

Many conventional recommendation systems determine user latent features and item latent features using matrix factorization. In matrix factorization, a matrix of ratings is generated based on user ratings of items. Then, the matrix of ratings is decomposed into a matrix of user latent features and a matrix of item latent features. Items can then be recommended based on a high correspondence between the user latent features and the item latent features.

One of the challenges faced by conventional matrix factorization techniques is providing recommendations when new users and/or new items arrive in the system, also known as the problem of "cold start". This is because matrix factorization utilizes historical data to recommend items, and there is no historical data when a new user or a new item first arrives in the system.

Additionally, many conventional recommendation systems analyze ratings data offline in order to generate recommendations. Thus, it is difficult for conventional recommendation systems to recommend items in an online setting and quickly adapt to user feedback and ratings as required by many real world applications, such as online advertising, serving personalized content, link prediction and product recommendations.

SUMMARY

Particle Thompson Sampling for online matrix factorization recommendation is described. Unlike conventional solutions, a recommendation system described here provides a recommendation of an item to a user by applying Thompson Sampling to a matrix factorization model. As described herein, the matrix factorization model corresponds to the matrix of ratings which may be decomposed into a matrix of user latent features and item latent features. By using Thompson Sampling, the recommendation system automatically combines finding the most relevant items with exploring new or less-recommended items, which solves the problem of cold start naturally. After recommending an item to the user, the recommendation system then receives a rating of the recommended item from the user. Unlike conventional solutions that only update user latent features, the recommendation system updates both user latent features and item latent features in the matrix factorization model based on the rating of the item. The updating can be performed in real time, which enables the recommendation system to quickly adapt to user ratings to provide new recommendations (e.g., other recommended items).

In one or more implementations, to update the user latent features and the item latent features in the matrix factorization model, the recommendation system utilizes a Rao-Blackwellized particle filter for online matrix factorization. Unlike conventional solutions which take several passes of the data and need the entire training data to be present, the online matrix factorization using a Rao-Blackwellized particle filter can be implemented in real time and only needs to go through the data set once.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
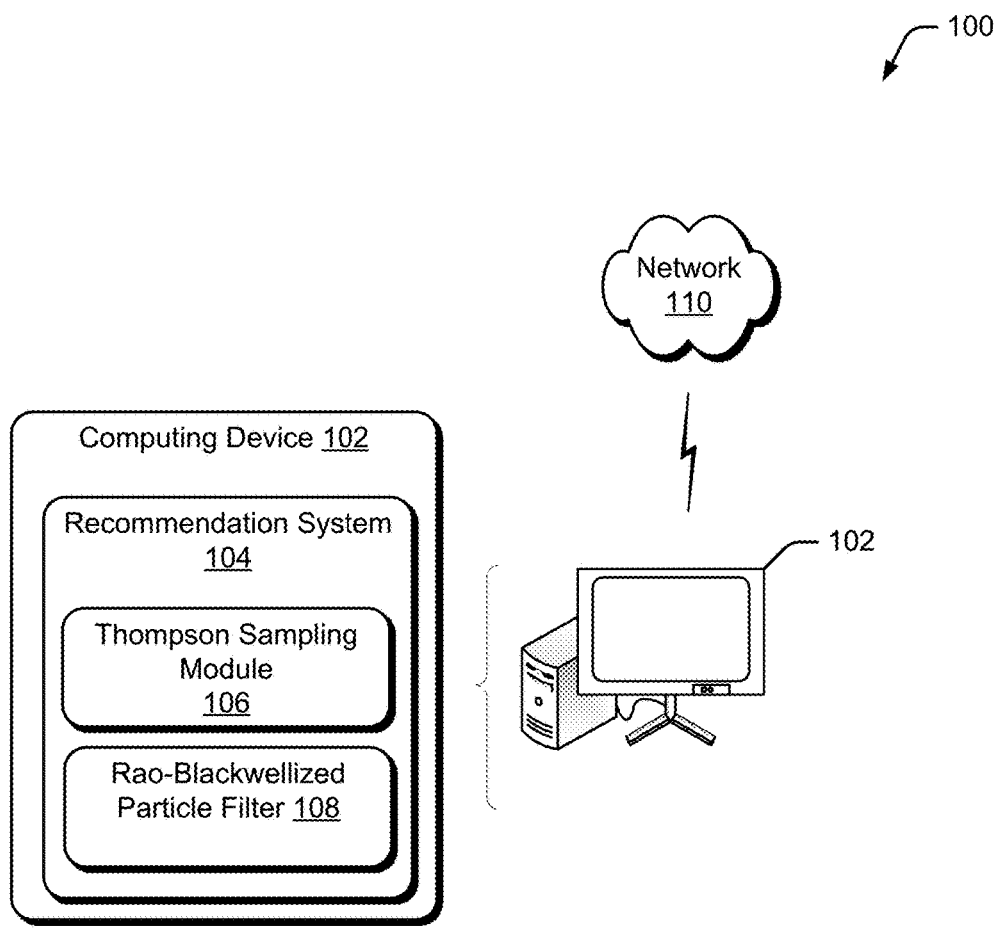
FIG. 1 illustrates an environment in an example implementation that is operable to employ techniques described herein.

In order to solve the cold start problem faced by conventional recommendation systems, the techniques described herein combine matrix factorization with a bandit algorithm in order to recommend items. An example bandit algorithm is a Thompson Sampling algorithm. The bandit algorithm uses a randomized probability-based matching process to recommend items. To do so, the bandit algorithm treats recommendations as a repeated game where the environment chooses a user (i) and the recommendation system chooses an item (j). A ratings value, $R_{ij}$, is revealed and the goal of the bandit algorithm is to minimize the cumulative regret with respect to an optimal solution. The bandit algorithm balances recommending new items to gather user feedback with recommending items that are already known to be liked by users. Thus, the bandit algorithm is ideally suited to solve the problem of cold start because it is able to recommend items that the user will like while at the same time exploring items in order to gather information about the user. For example, in online advertising, the bandit algorithm may balance the presentation of new ads, about which little is known, with the presentation of ads which are already known to attract a high click through rate. As another example, for personalized music recommendations, the bandit algorithm may balance recommending songs associated with a genre that the user has not listened to before with recommending songs that are closely related to songs that the user has already indicated they like.

In one or more implementations, a Thompson Sampling module of a recommendation system disclosed here uses a Thompson Sampling algorithm as the bandit algorithm. Note in other implementations in accordance with the techniques described here, other bandit algorithms may also be used with matrix factorization to provide recommendations. The Thompson Sampling module uses Thompson Sampling to recommend an item for a user. After an item is recommended, a rating is received from the user, and the Thompson Sampling module updates the matrix factorization model in order to provide a next recommendation.

The techniques described here solve another challenge faced by conventional recommendation systems when recommending items in an online setting. In particular, conventional systems are generally not able to recommend items and quickly adapt to user feedback, as required by many real world applications, e.g., online advertising, serving personalized content, link prediction, product recommendations, and so forth. Conventional solutions generally update only the current user's latent features, and the item's latent features remain fixed. In contrast, the Thompson Sampling module of the techniques described here is configured to update both the current user's latent features and the current item's latent features in the matrix factorization model, where these features are updated based on a "live" rating given by the current user. That is, when the recommendation system presents a new recommended item to a new user, the user provides a rating, which can be explicit or implicit, and this rating is recorded by the recommendation system for use in updating the matrix factorization model. The updating can be performed in real time which enables the recommendation system to quickly adapt to user ratings to provide new recommendations in an online setting.

In one or more implementations, the recommendation system utilizes a Rao-Blackwellized particle filter to update the user latent features and the item latent features. Unlike conventional solutions which take several passes of the data and need the entire training data to be present, the Rao-Blackwellized particle filter runs in real time, and only needs to go through the data set once. Thus, the Rao-Blackwellized particle filter is ideally suited for updating the user latent features and the item latent features in an online setting where the entire data set is not present.

Example Environment

FIG. 1 illustrates an environment 100 in an example implementation that is operable to employ techniques described herein. Environment 100 includes a computing device 102, which may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 6.

Computing device 102 is illustrated as including a recommendation system 104 that is representative of functionality to perform one or more techniques to generate recommendations of items for users in a matrix factorization environment.

Recommendation system 104 includes a Thompson Sampling module 106 and a Rao-Blackwellized particle filter 108. Thompson Sampling module 106 is representative of functionality to recommend items to users by applying a Thompson Sampling approach to matrix factorization. Rao-Blackwellized particle filter 108 is representative of functionality to update user later features and item latent features in a matrix factorization model based as ratings are received in an online setting.

Figure 6:
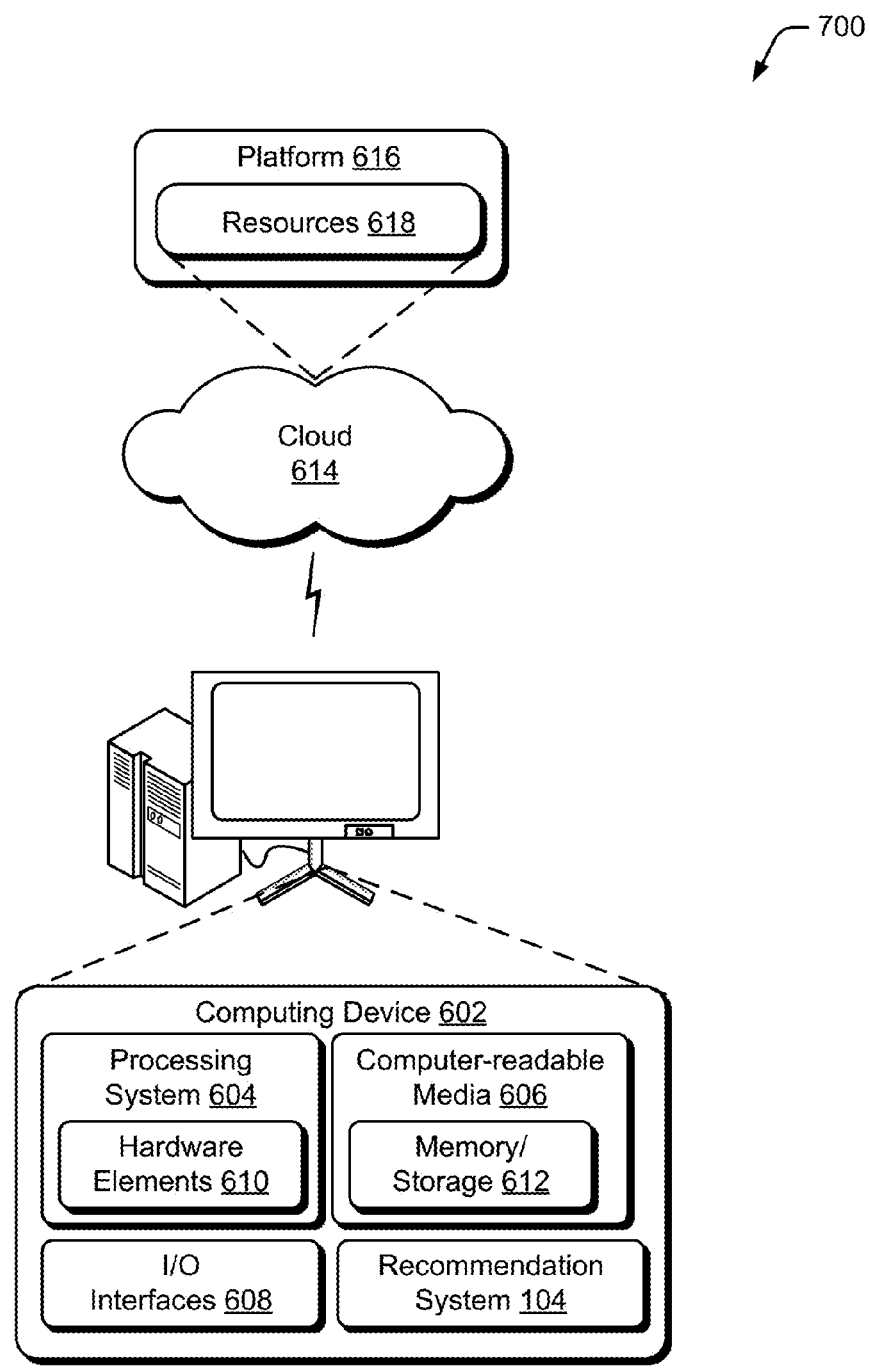
FIG. 6 illustrates an example system that includes an example computing device that is representative of one or more computing systems and/or devices that may implement the various techniques described herein.

Although illustrated as part of computing device 102, functionality of recommendation system 104 may also be implemented in a distributed environment, remotely via a network 110 (e.g., "over the cloud") as further described in relation to FIG. 6, and so on. Although network 110 is illustrated as the Internet, the network may assume a wide variety of configurations. For example, network 110 may include a wide area network (WAN), a local area network (LAN), a wireless network, a public telephone network, an intranet, and so on. Further, although a single network 110 is shown, network 110 may also be configured to include multiple networks.

Figure 2:
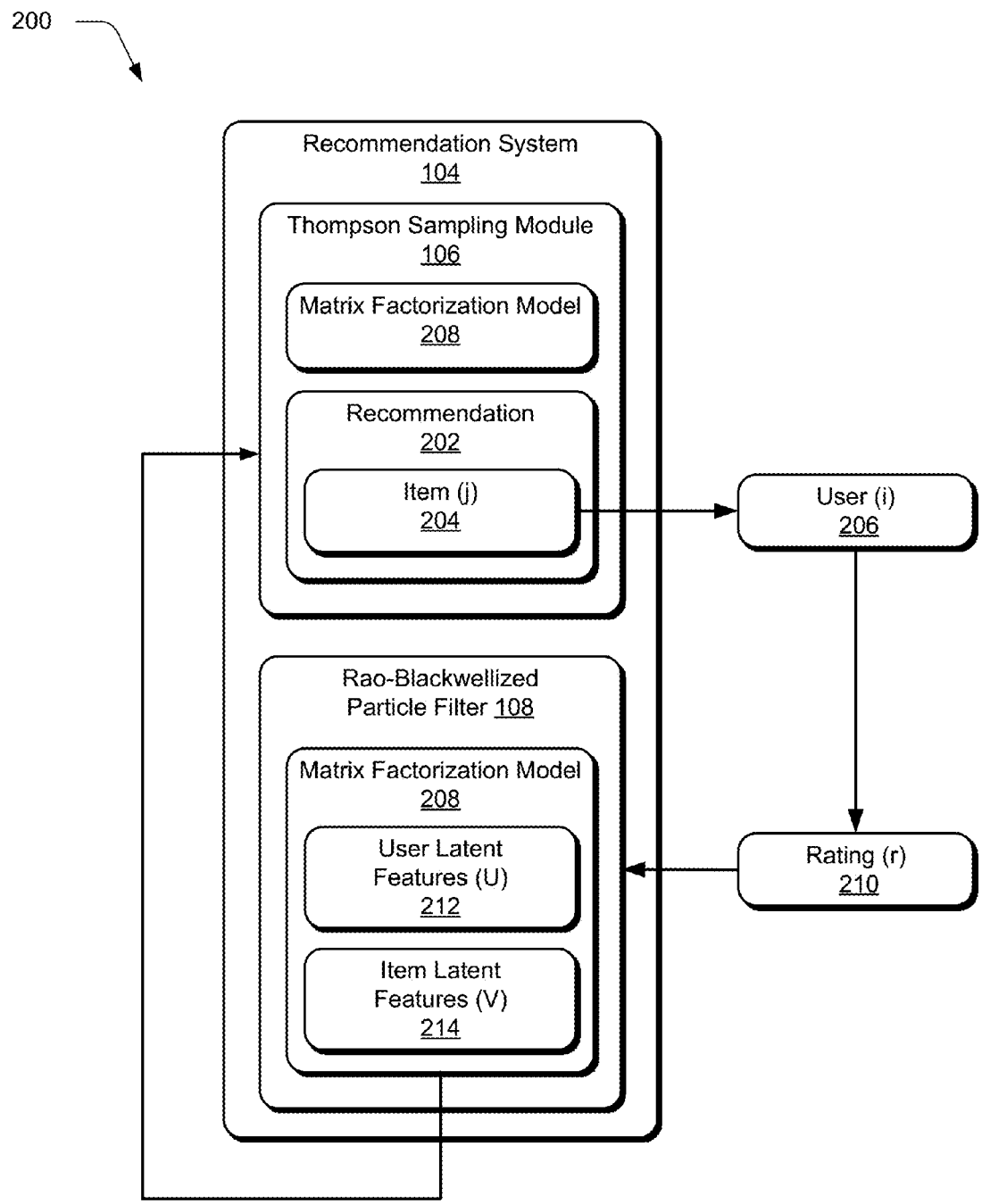
FIG. 2 illustrates a system in an example implementation in which a recommendation system provides a recommendation of an item for a user using Thompson Sampling and a Rao-Blackwellized particle filter specialized for online matrix factorization.

FIG. 2 illustrates a system 200 in an example implementation in which recommendation system provides a recommendation of an item for a user using Thompson Sampling and a Rao-Blackwellized particle filter specialized for online matrix factorization. To begin, Thompson Sampling module 106 provides a recommendation 202 of an item 204 for a user 206 by applying Thompson Sampling to a matrix factorization model 208. Thompson Sampling module 106 can be implemented to provide recommendation 202 in a live or online setting, such as when user 206 is utilizing a content service, such as Pandora®, Netflix®, and so forth. As described throughout, items 204 may correspond to any type of item, such as products, videos, songs, advertisements, and so forth.

Generally, matrix factorization model 208 associates ratings of items with user latent features and item latent features. As described herein, item latent features describe features of items, while user latent features describe features of users. The features are considered "latent" because they are inferred from user ratings of the items. As an example, item latent features for movies might measure whether a movie is a drama or a comedy, the amount of action or violence, or whether the movie is suitable for children. In contrast, user latent features for movies may measure the genres of movies a user likes or dislikes, actors that the user likes and dislikes, and so forth. Generally, a high correspondence between user latent features and item latent features leads to a recommendation.

However, by using Thompson Sampling, the recommendation system automatically combines finding the most relevant items with exploring new or less-recommended items, which solves the problem of cold start naturally. A detailed example of a Thompson Sampling algorithm which may be used by Thompson Sampling module 106 is discussed below in the section titled "Example Algorithm".

In response to receiving item 204, the user provides a rating 210 of item 204, which is received by recommendation system 104. Generally, rating 210 indicates whether or not the user liked the recommended item 204. As described throughout, ratings 210 may include any type of rating, including explicit ratings (e.g., liking the item, loving the item, or providing a star rating) and implicit ratings or feedback that are based on the user's interaction with the item. For example, if item 204 is a song, and the user listens to the entire song, this may result in a positive implicit rating or feedback, whereas if the user "skips" to a next song, this may result in a negative implicit rating or feedback.

In response to receiving rating 210, recommendation system 104 updates matrix factorization model 208 by updating both user latent features 212 and item latent features 214 based on rating 210. In one or more implementations, matrix factorization model 208 is updated by Rao-Blackwellized particle filter 108. Unlike prior solutions, Rao-Blackwellized particle filter 108 is configured to update both the user latent features 212 and the item latent features 214 in an online setting. Thus, Rao-Blackwellized particle filter 108 learns both the user and item latent features, U and V respectively, while conventional solutions learn only the user latent features because the item latent features are fixed. Furthermore, Rao-Blackwellized particle filter 108 updates matrix factorization model 208 quickly and efficiently, without having to update the entire data set. This enables Thompson Sampling module 106 to quickly provide additional recommendations to users based on the updated matrix factorization model 208.

Having discussed an example recommendation system, consider now a detailed discussion of an example algorithm that may be utilized by recommendation system 104 to recommend items to users.

Example Algorithm

As discussed above, recommendation system 104 is configured to leverage Thompson Sampling module 106 and Rao-Blackwellized particle filter 108 to provide a matrix factorization recommendation of items for users. Using Thompson Sampling and Rao-Blackwellized particle filtering enables recommendation system 104 to simultaneously update a posterior probability of users (U) and items (V) of matrix factorization model 210 in an online manner while minimizing the cumulative regret.

Figure 3:
FIG. 3 illustrates an example algorithm which may be utilized by a recommendation system to provide item recommendations in accordance with various implementations.

FIG. 3 illustrates an example algorithm 300 which may be utilized by recommendation system 104 to provide recommendations in accordance with one or more implementations. In one or more implementations, Thompson Sampling module 106 implements lines 1-13 of algorithm 300 and Rao-Blackwellized particle filter implements lines 14-20 of algorithm 300.

In matrix completion, a portion $R^O$ of the N×M matrix $R=(r_{ij})$ is observed, and the goal is to infer the unobserved entries of R. In probabilistic matrix factorization (PMF), R is assumed to be a noisy perturbation of a rank-K matrix $\bar{R}=UV^T$ where $U_{N \times K}$ and $V_{M \times K}$ (are termed the user and item latent features (K is typically small). The full generative model of PMF is:

$$U_i \text{ i.i.d.} \sim \mathcal{N}(0, \sigma_U^2 I_K)$$

$$V_j \text{ i.i.d.} \sim \mathcal{N}(0, \sigma_V^2 I_K)$$

$$r_{ij}|U,V \text{ i.i.d.} \sim \mathcal{N}(U_i^T V_j, \sigma^2) \qquad (1)$$

where the variances ($\sigma^2, \sigma_U^2, \sigma_V^2$) are the parameters of the model. Further, consider a full Bayesian treatment where the variances $\sigma_U^2$ and $\sigma_V^2$ are drawn from an inverse Gamma prior (while $\sigma^2$ is held fixed), i.e., $\lambda_U = \sigma_U^{-2} \sim \Gamma(\alpha, \beta)$; $\lambda_V = \sigma_V^{-2} \sim \Gamma(\alpha, \beta)$ (this is a special case of the Bayesian PMF where only isotropic Gaussians are considered).

Given this generative model, from the observed ratings $R^O$, the goal of recommendation system 104 is to estimate the user latent features 212 and item latent features 214, referred to as parameters U and V respectively in algorithm 300, which will enable "completion" of the matrix R. PMF is a MAP point-estimate which finds U, V to maximize $Pr(U,V|R^O, \sigma, \sigma_U, \sigma_V)$ via (stochastic) gradient ascend or using a least squares approach. Bayesian PMF attempts to approximate the full posterior $Pr(U,V|R^O, \sigma, \alpha, \beta)$. The joint posterior of U and V are intractable, however, the structure of the graphical model can be exploited to derive an efficient Gibbs sampler.

In a conventional recommendation system, users and observed ratings arrive over time, and the task of the system is to recommend an item for each user so as to maximize the accumulated expected rewards. A bandit setting arises from the fact that the recommendation system needs to learn over time what items have the best ratings (for a given user) to recommend, and at the same time sufficiently explore all the items.

A matrix factorization bandit may be formulated as follows. Assume that ratings are generated following Eq. (1) with fixed but unknown user latent features 212 and item latent features 214, respectively (U*,V*). At time t, the environment chooses user $i_t$ and Thompson Sampling module 106 provides recommendation 202 of item ($j_t$) 204 for a user $i_t$ (206).

User 206 then rates the recommended item 204 with rating 210, $r_{i_t j_t} \sim \mathcal{N}(U_{i_t}^{*T} V_{j_t}^*, \sigma^2)$, and recommendation system 104 receives this rating as a reward. This rating may be abbreviated as $r_t^O = T_{i_t j_t}$.

In various implementations, Thompson Sampling module 106 is configured to provide recommendation 202 of item $j_t$ using a policy that takes into account the history of the observed ratings prior to time t, $r_{1:t-1}^O$, where $r_{1:t}^O = \{(i_k, j_k, r_k^O)\}_{k=1}^t$. The highest expected reward the system can earn at time t is $\max_j U_{i_t}^{*T} V_j^*$, and this is achieved if the optimal item $j^*(i) = \arg\max_j U_i^{*T} V_j^*$ is recommended. Since (U*, V*) are unknown, the optimal item $j^*(i)$ is also not known a priori. The quality of recommendation system 104 is measured by its expected cumulative regret:

$$CR = \mathbb{E}\left[\sum_{t=1}^n [r_t^O - r_{i_t, j^*(i_t)}]\right] = \mathbb{E}\left[\sum_{t=1}^n \left[r_t^O - \max_j U_{i_t}^{*T} V_j^*\right]\right] \qquad (6)$$

where the expectation is taken with respect to the choice of the user at time t and also the randomness in the choice of the recommended items by the algorithm.

To use the Thompson Sampling for matrix factorization, Thompson Sampling module 106 incrementally updates the "posterior" of the user latent features 212 and the item latent features 214 (U, V), which controls the reward structure. As discussed above, in at least some implementations, the posterior of the user latent features 212 and item latent features 214 may be updated by Rao-Blackwellized particle filter 108.

In accordance with various implementations, Rao-Blackwellized particle filter 108 is configured to exploit the specific structure of the probabilistic matrix factorization model. Let $\theta=(\sigma, \alpha, \beta)$ be the control parameters and let posterior at time t be $p_t=\Pr(U, V, \sigma_U, \sigma_V, |r_{1:t}^O, \theta)$. Notably, a standard particle filter would sample all of the parameters (U, V, $\sigma_U$, $\sigma_V$). Unfortunately, degeneracy is highly problematic for such a conventional particle filter even when $\sigma_U$, $\sigma_V$ are assumed known.

Thus, in various implementations, Rao-Blackwellized particle filter 108 maintains the posterior distribution $p_t$ as follows. Each of the particle conceptually represents a point-mass at V, $\sigma_U$ (U and $\sigma_V$ are integrated out analytically whenever possible)$^2$. Thus, $p_t$ (V, $\sigma_U$) is approximated by $$\hat{p}_t = \frac{1}{D}\sum_{d=1}^{D} \delta_{(V^{(d)}, \sigma_U^{(d)})}$$

where D is the number of particles.

Crucially, since Rao-Blackwellized particle filter 108 needs to estimate a set of non-time-varying parameters, having an effective and efficient MCMC-kernel move $K_t(V', \sigma_U'; V, \sigma_U)$ stationary with regards to $p_t$ is essential. This design of the move kernel $K_t$ is based on two observations. First, U and $\sigma_V$ can be used as auxiliary variables, effectively sampling $U, \sigma_V | V, \sigma_U \sim p_t(U, \sigma_V | V, \sigma_U)$, and then $V', \sigma_U' | U, \sigma_V \sim p_t(V', \sigma_U' | U, \sigma_V)$. However, this move would be highly inefficient due to the number of variables that need to be sampled at each update.

The second observation is that user latent features for all users except the current user $U_{-i_t}$ are independent of the current observed rating $r_t^O$: $p_t(U_{-i_t} | V, \sigma_U) = p_{t-1}(U_{-i_t} | V, \sigma_U)$ therefore, at time t, $U_{i_t}$ is resampled, but there is no need to resample $U_{-i_t}$. Furthermore, the item latent feature of the current item $V_{j_t}$ may also be resampled. This leads to an efficient implementation of Rao-Blackwellized Particle Filter 108 where each particle in fact stores U, V, $\sigma_U$, $\sigma_V$, where (U, $\sigma_V$) are auxiliary variables, and for the kernel move $K_t$, $U_{i_t} | V, \sigma_U$ then $V_{j_t}' | U, \sigma_U$ and $\sigma_U' | U$ is sampled.

Notably, in algorithm 300, at each time t, the complexity is $\mathcal{O}(((\hat{N}+\hat{M})K^2+K^3)D)$ where $\hat{N}$ and $\hat{M}$ are the maximum number of users who have rated the same item and the maximum number of items rated by the same user, respectively. The dependency on $K^3$ arises from having to invert the precision matrix, but this is not a concern since the rank K is typically small. In one or more implementations, Line 24 of Particle Thompson Sampling algorithm 300 may be replaced by an incremental update with caching: after line 22, $\Lambda_j^v$ and $\zeta_j^v$ may be incrementally updated for all item j previously rated by the current user i. This reduces the complexity to $\mathcal{O}((\hat{M}K^2+K^3)D)$, a significant improvement in real recommendation systems where each user tends to rate a small number of items.

Having discussed an example algorithm which may be used by recommendation system 104 to recommend items for users, consider now a discussion of example procedures.

Example Procedures

The following discussion describes techniques for particle Thompson Sampling for online matrix factorization recommendation that may be implemented utilizing the previously described systems and devices. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks.

Figure 4:
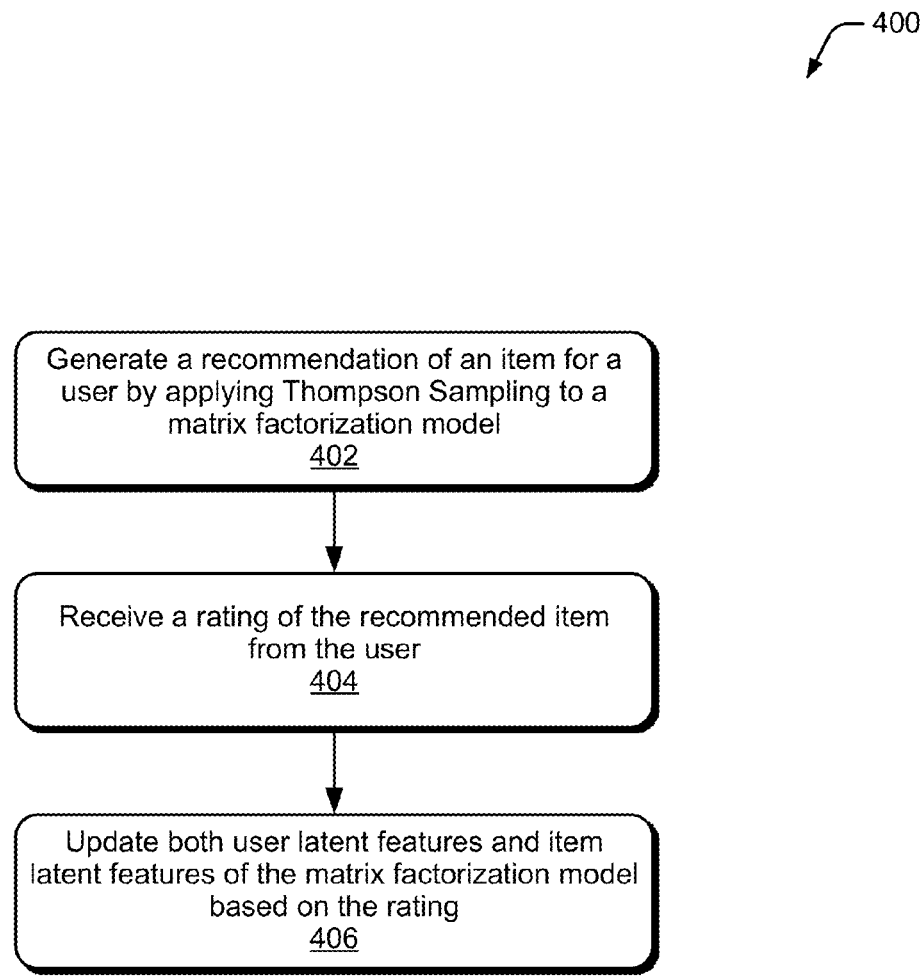
FIG. 4 illustrates a procedure 400 in an example implementation of generating a recommendation of an item for a user using Thompson Sampling.

FIG. 4 illustrates a procedure 400 in an example implementation of generating a recommendation of an item for a user using Thompson Sampling.

At 402, a recommendation of an item is generated for a user by applying Thompson Sampling to a matrix factorization model. For example, Thompson Sampling module 106 generates a recommendation 202 of an item 204 for a user 206 by applying Thompson Sampling to matrix factorization model 208.

At 404, a rating of the recommended item is received from the user. For example, Thompson Sampling module 106 receives a rating 210 of the recommended item 204 from user 206.

At 406, both user latent features and item latent features of the matrix factorization model are updated based on the rating. For example, recommendation system 104 updates user latent features 212 and item latent features 214 of matrix factorization model 208 based on rating 210. In one or more implementations, the updating may be implemented by Rao-Blackwellized particle filter 108.

Figure 5:
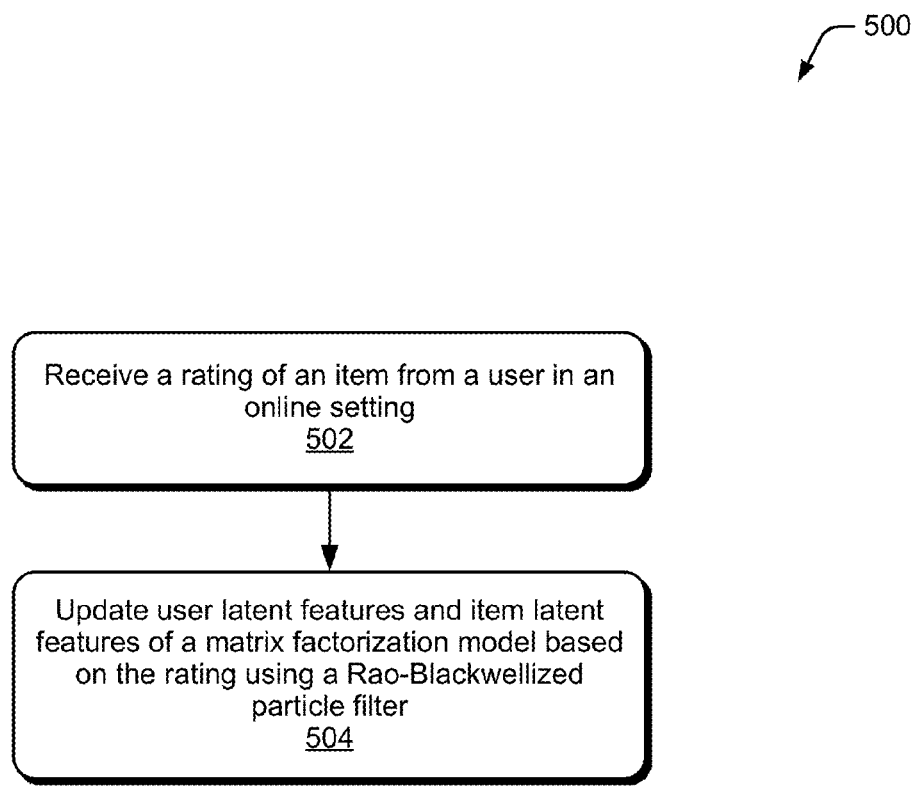
FIG. 5 illustrates a procedure 500 in an example implementation of updating user latent features and item latent features of a matrix factorization model using a Rao-Blackwellized particle filter.

FIG. 5 illustrates a procedure 500 in an example implementation of updating user latent features and item latent features of a matrix factorization model using a Rao-Blackwellized particle filter.

At 502, a rating of an item is received from a user. For example, Rao-Blackwellized particle filter 108 receives rating 210 of item 204 from user 206.

At 504, user latent features and item latent features of a matrix factorization model are updated based on the rating. For example, Rao-Blackwellized particle filter updates user latent features 212 and item latent features 214 of matrix factorization model 208 based on rating 210.

Example System and Device

FIG. 6 illustrates an example system generally at 600 that includes an example computing device 602 that is representative of one or more computing systems and/or devices that may implement the various techniques described herein. This is illustrated through inclusion of recommendation system 104 which may be configured to implement the techniques as previously described.

The computing device 602 may be, for example, a server of a service provider, a device associated with a client (e.g., a client device), an on-chip system, and/or any other suitable computing device or computing system. The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A recommendation system comprising:
one or more server computing devices comprising one or more modules implemented at least partially in hardware and configured to perform operations comprising:
generating a recommendation of an item of a plurality of items for a user by applying a bandit algorithm to a matrix factorization model to select the item from the plurality of items;
communicating the recommendation of the item to a client device of the user over a network;
receiving, over the network, a rating of the item from the client device of the user;
updating, in real-time, both a user latent feature of the user and an item latent feature of the item of the matrix factorization model based on the rating of the item;
generating an additional recommendation of an additional item of the plurality of items for the user by applying the bandit algorithm to the updated matrix factorization model to select the additional item from the plurality of items; and
communicating the additional recommendation of the additional item to the client device of the user over the network.

2. The recommendation system of claim 1, wherein the bandit algorithm comprises a Thompson Sampling algorithm.

3. The recommendation system of claim 1, wherein the updating comprises updating, in real-time, both the user latent feature of the user and the item latent feature of the item of the matrix factorization model in an online setting.

4. The recommendation system of claim 3, wherein the updating is performed by a Rao-Blackwellized particle filter.

5. The recommendation system of claim 1, wherein the matrix factorization model associates ratings of items with user latent features and item latent features.

6. The recommendation system of claim 1, wherein the applying the bandit algorithm to the matrix factorization model causes the recommendation system to automatically combine finding relevant items with exploring new or less-relevant items.

7. The recommendation system of claim 1, wherein the recommended item comprises one or more of a product, a song, a movie, or an advertisement.

8. The recommendation system of claim 1, wherein the rating comprises an explicit rating.

9. The recommendation system of claim 1, wherein the rating comprises an implicit rating.

10. A computer-implemented method comprising:
receiving, over a network, a rating of a recommended item from a client device of a user in an online setting; and
applying a Rao-Blackwellized particle filter to update, in real-time, both user latent features and item latent features of the matrix factorization model based on the rating to enable an additional recommendation of an additional item to the user based on the updated matrix factorization model.

11. The computer-implemented method of claim 10, wherein the recommended item is recommended using a matrix factorization model.

12. The computer-implemented method of claim 10, wherein the rating comprises an explicit rating or an implicit rating.

13. The computer-implemented method of claim 10, wherein the recommended item comprises one or more of a product, a song, a movie, or an advertisement.

14. A computer-implemented method comprising:
generating, at a computing device, a recommendation of an item of a plurality of items for a user by applying Thomson Sampling to a matrix factorization model;
communicating the recommendation of the item to a client device of the user over a network;
receiving, over the network, a rating of the item from the client device of the user;
updating, in real-time, the matrix factorization model based on the rating of the item; and
generating an additional recommendation of an additional item for the user by applying Thompson Sampling to the updated matrix factorization model.

15. The computer-implemented method of claim 14, wherein the updating comprises updating the matrix factorization model using a Rao-Blackwellized particle filter.

16. The computer-implemented method of claim 15, wherein the Rao-Blackwellized particle filter updates the matrix factorization model by updating both user latent features and item latent features in the matrix factorization model based on the rating of the item.

17. The computer-implemented method of claim 14, wherein the applying Thompson Sampling to the matrix factorization model causes the recommendation system to automatically combine finding relevant items with exploring new or less-relevant items.

18. The computer-implemented method of claim 14, wherein the updating is performed in an online setting.

19. The computer-implemented method of claim 14, wherein the rating comprises an explicit rating or an implicit rating.

20. The computer-implemented method of claim 10, further comprising communicating the additional recommendation of the additional item to the client device of the user over the network.

* * * * *